US012734513B2

(12) United States Patent
Kopatsch

(10) Patent No.: US 12,734,513 B2

(45) Date of Patent: Sep. 15, 2026

(54) GAUZES HAVING A TERTIARY STRUCTURE FOR THE CATALYTIC CONVERSION OF FLUIDS

(71) Applicant: Jens Kopatsch, Shanghai (CN)

(72) Inventor: Jens Kopatsch, Shanghai (CN)

( * ) Notice: Subject to any disclaimer, the term of this patent is extended or adjusted under 35 U.S.C. 154(b) by 720 days.

(21) Appl. No.: 18/018,939

(22) PCT Filed: Jul. 30, 2021

(86) PCT No.: PCT/EP2021/071472

§ 371 (c)(1),
(2) Date: Jan. 31, 2023

(87) PCT Pub. No.: WO2022/029042

PCT Pub. Date: Feb. 10, 2022

(65) Prior Publication Data

US 2023/0321644 A1 Oct. 12, 2023

(30) Foreign Application Priority Data

Aug. 7, 2020 (DE) ..................... 10 2020 120 927.4

(51) Int. Cl.

| | |
|---|---|
| ***B01J 35/58*** | (2024.01) |
| ***B01J 23/38*** | (2006.01) |
| ***C01B 21/26*** | (2006.01) |
| ***C01C 3/02*** | (2006.01) |
| ***D04B 1/14*** | (2006.01) |

(52) U.S. Cl.

CPC ............... *B01J 35/58* (2024.01); *B01J 23/38* (2013.01); *C01B 21/265* (2013.01); *C01C 3/0216* (2013.01); *D04B 1/14* (2013.01); *D10B 2101/20* (2013.01); *D10B 2403/0221* (2013.01); *D10B 2505/00* (2013.01)

(58) Field of Classification Search

CPC ... B01J 23/38; B01J 23/40; B01J 23/89; B01J 35/58; C01B 21/265; C01C 3/0216; D04B 1/14; D04B 2101/20; D04B 2403/0211; D04B 2403/0221

See application file for complete search history.

(56) References Cited

U.S. PATENT DOCUMENTS 4,645,704 A * 2/1987 Hellwig .................. D06Q 1/04 442/232
5,356,603 A 10/1994 Hochella et al.
5,527,756 A 6/1996 Ostroff (Continued)

FOREIGN PATENT DOCUMENTS

DE 101 05 624 A1 10/2002
EP 0 504 723 A1 9/1992

(Continued)

OTHER PUBLICATIONS

International Search Report in PCT/EP2021/071472, mailed Dec. 7, 2021.

*Primary Examiner* — Brian A McCaig

(74) *Attorney, Agent, or Firm* — Collard & Roe, P.C.

(57) ABSTRACT

Three-dimensionally knitted noble metal gauzes, or sections of such gauzes, for carrying out catalytic reactions of fluids are knitted in two or multiple layers and the meshes of the individual layers are connected to one another in one form by a pile thread or multiple pile threads, so that the noble metal gauze has a tertiary structure.

8 Claims, 11 Drawing Sheets

(56) References Cited

U.S. PATENT DOCUMENTS

Figure 1:
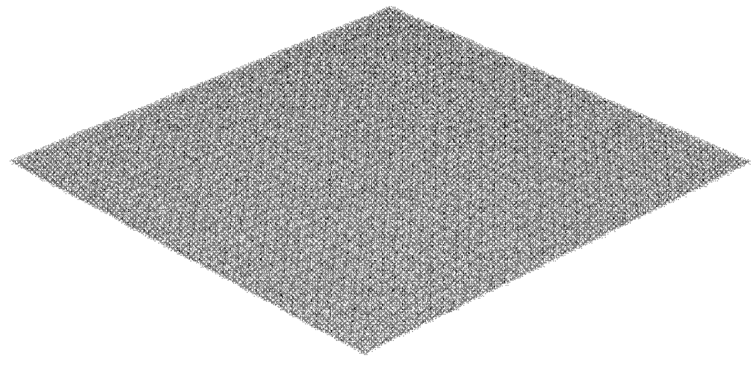

| | | | |
|---|---|---|---|
| 6,073,467 | A | 6/2000 | Blass et al. |
| 2002/0127932 | A1 | 9/2002 | Neumann et al. |

FOREIGN PATENT DOCUMENTS

| | | | |
|---|---|---|---|
| EP | 0 680 767 | A1 | 11/1995 |
| EP | 0 680 787 | A1 | 11/1995 |
| EP | 1 358 010 | B1 | 10/2004 |
| EP | 3 056 267 | A1 | 8/2016 |

* cited by examiner

GAUZES HAVING A TERTIARY STRUCTURE FOR THE CATALYTIC CONVERSION OF FLUIDS

CROSS REFERENCE TO RELATED APPLICATIONS

This application is the National Stage of PCT/EP2021/071472 filed on Jul. 30, 2021, which claims priority under 35 U.S.C. § 119 of German Application No. 10 2020 120 927.4 filed on Aug. 7, 2020, the disclosure of which is incorporated by reference. The international application under PCT article 21(2) was not published in English.

The present invention relates to the production of catalytic gauzes, which may be used for the reaction of fluids. Typical reactions are the reaction of ammonia in the presence of oxygen in the production of nitric acid (Ostwald process), the reaction of ammonia with methane in the presence of oxygen for the production of hydrogen cyanide (Andrussow process) and the cracking of hydrocarbons.

In these processes, the reaction takes place by heterogeneous catalysis in the presence of noble-metal-containing catalysts. The production of nitric acid takes place in three steps:

$$4NH_3(g)+5O_2(g)\rightarrow 4NO(g)+6H_2O(g) \quad \text{(Reaction 1)}$$

$$2NO(g)+O_2(g)\rightarrow 2NO_2(g) \quad \text{(Reaction 2)}$$

$NO_2$ dimerizes to dinitrogen tetroxide $2NO_2(g)\leftrightarrows N_2O_4(g)$ $$2N_2O_4(g)+O_2(g)+2H_2O(l)\rightarrow 4HNO_3(aq) \quad \text{(Reaction 3)}$$

Step 1 requires the presence of catalytic noble metals such as platinum, rhodium, palladium, alloys of these metals or alloys of noble metals with copper and/or nickel. Platinum-rhodium alloys with a rhodium percentage by mass of 1-12% and platinum-palladium-rhodium alloys with a palladium-rhodium percentage by mass are common. Palladium-nickel alloys with a nickel percentage by mass of 2-15%, palladium-copper alloys with a copper percentage by mass of 2-15% and palladium-nickel-copper alloys with a copper-nickel percentage by mass of 2-15% are also used.

In practice, the goal for heterogeneous catalysts is that the catalyst offers the largest possible surface. Such a surface is particularly important in view of the high costs of noble metals in those catalysts. Wires of noble metal or noble-metal alloys are weft-knitted to gauzes with commercial machines from the industry. The use of weaving machines and warp-knitting machines is also prior art. The processed wires usually have a diameter of 45-150 μm. An optional copper coating improves mechanical properties during the weft knitting and may be removed afterward in an acid bath.

These gauzes of metal wires are incorporated perpendicular to the direction of flow of the gas to be catalytically converted in the reactor, but in principle may also be incorporated with a tangential angle of admission. Several of these gauzes are incorporated one after the other in the reactor. For this purpose, the gauzes do not have to use the same type of production or alloy. Palladium gauzes are often used as catchment gauzes at the end of the chain, since they are capable of catching some of the platinum and rhodium losses from the first gauzes. The incorporation of several of these gauzes is also known as a catalyst pack.

The gauzes are not simple thread lattices but instead are complex weft-knitted and warp-knitted fabrics, which are intended to provide the largest possible admission surface. The documents EP 0 504 723 A1 and EP 0 680 767 A1 describe the prior art.

Figure 2:
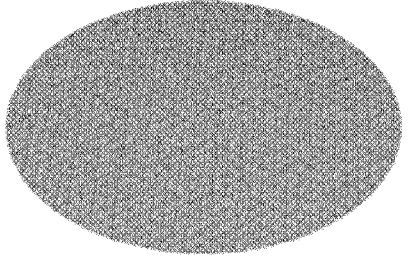

The production of weft-knitted gauzes is currently to be preferred over the production of woven gauzes, since the production of weft-knitted gauzes needs shorter setup times and, moreover, the gauze can be weft-knitted directly in the needed shape for the reactor, for example without having to cut out a circular gauze from a rectangular gauze. This advantage is preserved even if a gauze has to be assembled from several individual gauzes because the gauze size is limited by the diameter in commercial flat weft-knitting machines. FIG. 1 (computer-generated) shows, for example, a rectangular gauze fabric. FIG. 2 (computer-generated) shows, for example, a round woven fabric. Flat weft-knitting machines permit the direct generation of round or oval gauzes or gauze parts. A weft knitting in several parallel layers and subsequent folding in order to circumvent diameter limitations is also known. An excision of a round gauze from a rectangle requires more production time, and the cut-out piece must be reprocessed to wire with expenditure of time and energy.

The flat shape of the catalyst gauzes will be designated here as the primary structure. EP 1 358 010 B1 mentions three-dimensional catalyst gauzes weft-knitted in two or more layers. DE 1 010 5624 A1 describes three-dimensional catalyst gauzes weft-knitted in one or more layers for gas reactions, wherein the stitches of the individual layers are connected to one another by pile threads and weft threads are inserted between the layers of stitches. Such a three-dimensional weft-knitted gauze will be designated here as a gauze with secondary structure.

According to the invention present herein, it is possible to produce such catalytic gauzes with a tertiary structure. Examples of gauzes with tertiary structure are wavelike (corrugated) gauzes. Such gauzes are prior art and are described in U.S. Pat. Nos. 5,527,756 A and 5,356,603 A among other sources. The advantages of a wavelike, catalytically active gauze are specified as follows by the well-known manufacturer Johnson Matthey:

- increased contact surface with increased resistance to air flow and, consequently,
- increased material conversion of ammonium
- reduced pressure drop
- longer campaign lengths
- lower energy costs
- reduced noble-metal loss.

Figure 3:
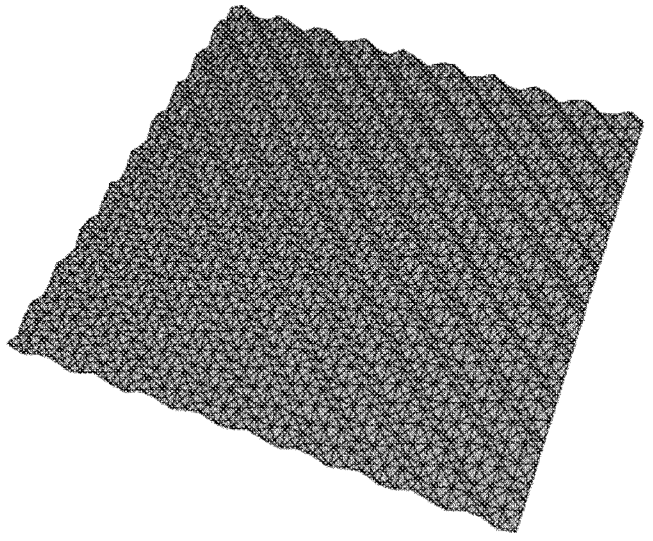

As described in U.S. Pat. Nos. 5,527,756 A and 5,356,603 A, these wavelike, catalytically active gauzes are generated by laying a planar gauze on a rigid, permeable but non-planar surface, for example a preformed metal gauze. This structured, permeable surface, which is not catalytically active, induces its own tertiary structure, for example a wave pattern, on the surface of the laid or applied catalytically active gauze. One of the disadvantages of this configuration is the greater weight of the gauzes, since the catalyst pack in this configuration also contains constituents that are significantly non-catalytically active. FIG. 3 (computer-generated) shows, for example, a gauze with tertiary structure.

The invention present herein unites the advantages of both processes, since the gauzes produced with this process have not only a primary structure and secondary structure but also a tertiary structure. The tertiary structure, e.g. wavelike, is obtained in this case directly from the weft-knitting process and does not require any induction by a rigid surface that may be catalytically inactive.

For this purpose, a gauze in two or more layers of stitches is connected by pile threads in such a way that a tertiary structure, for example a wave pattern, is obtained. The tertiary structure may be symmetric but does not have to be.

Even non-symmetric structures may be generated with this process. Gauzes for all reactor types may be weft-knitted without any need for a new reactor. Possible size limitations due to weft-knitting machines can be circumvented by joining several partial pieces together as one gauze. A production may be achieved by commercial machines, e.g. Stoll flatbed weft-knitting machines. The gauzes with secondary and tertiary structure can be produced directly in circular shape, or in partial pieces of a circular shape in composite gauzes for large reactors. A cutting-to-size of gauzes, which would produce cutting leftovers that have to be reprocessed, is not necessary.

The gauzes described here unite the advantages of the known three-dimensional gauzes (gauzes with secondary structure) with corrugated gauzes (gauzes with tertiary structure). Disadvantages are not created as a result.

Figure 4:
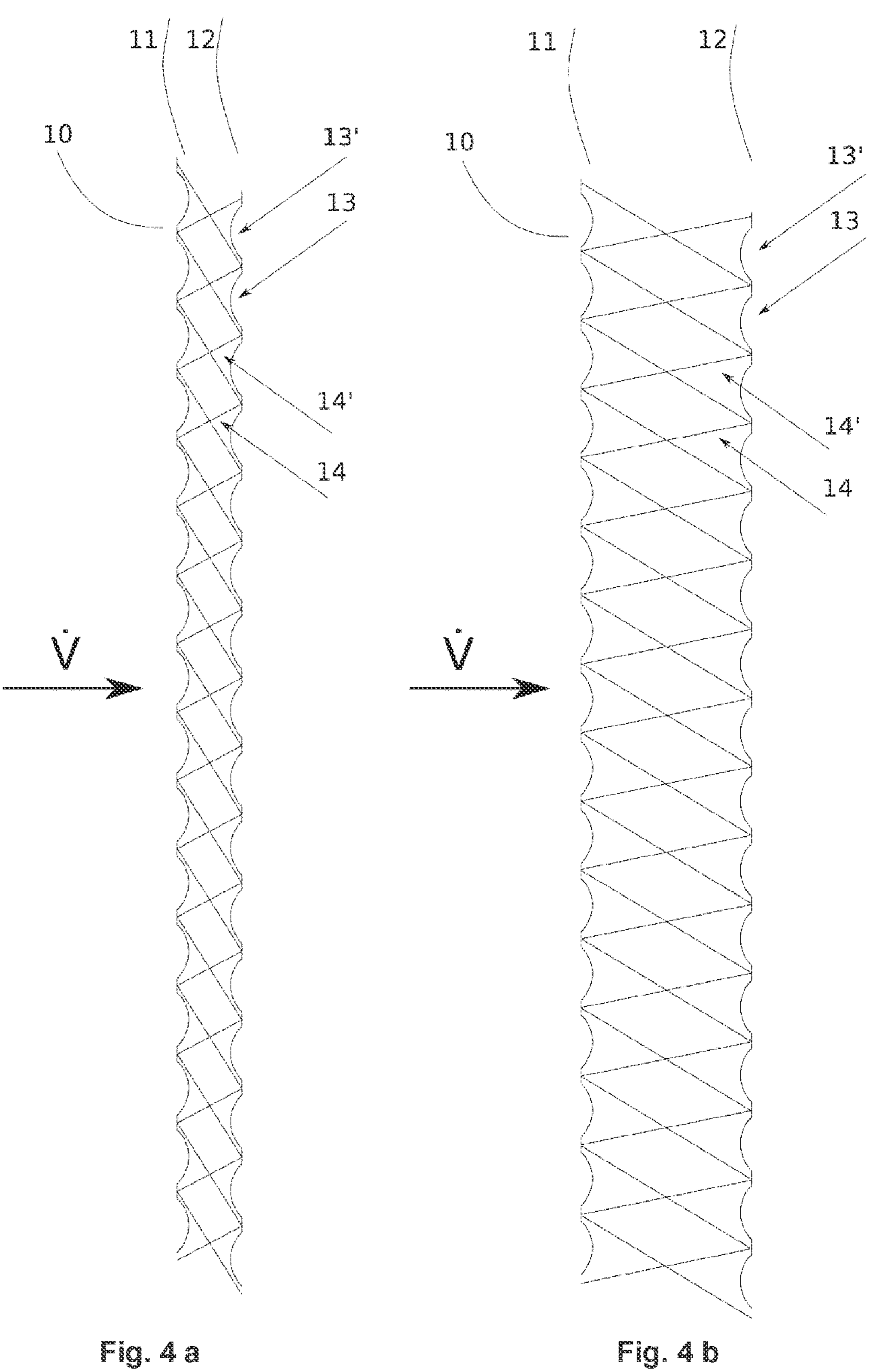
Figure 5:
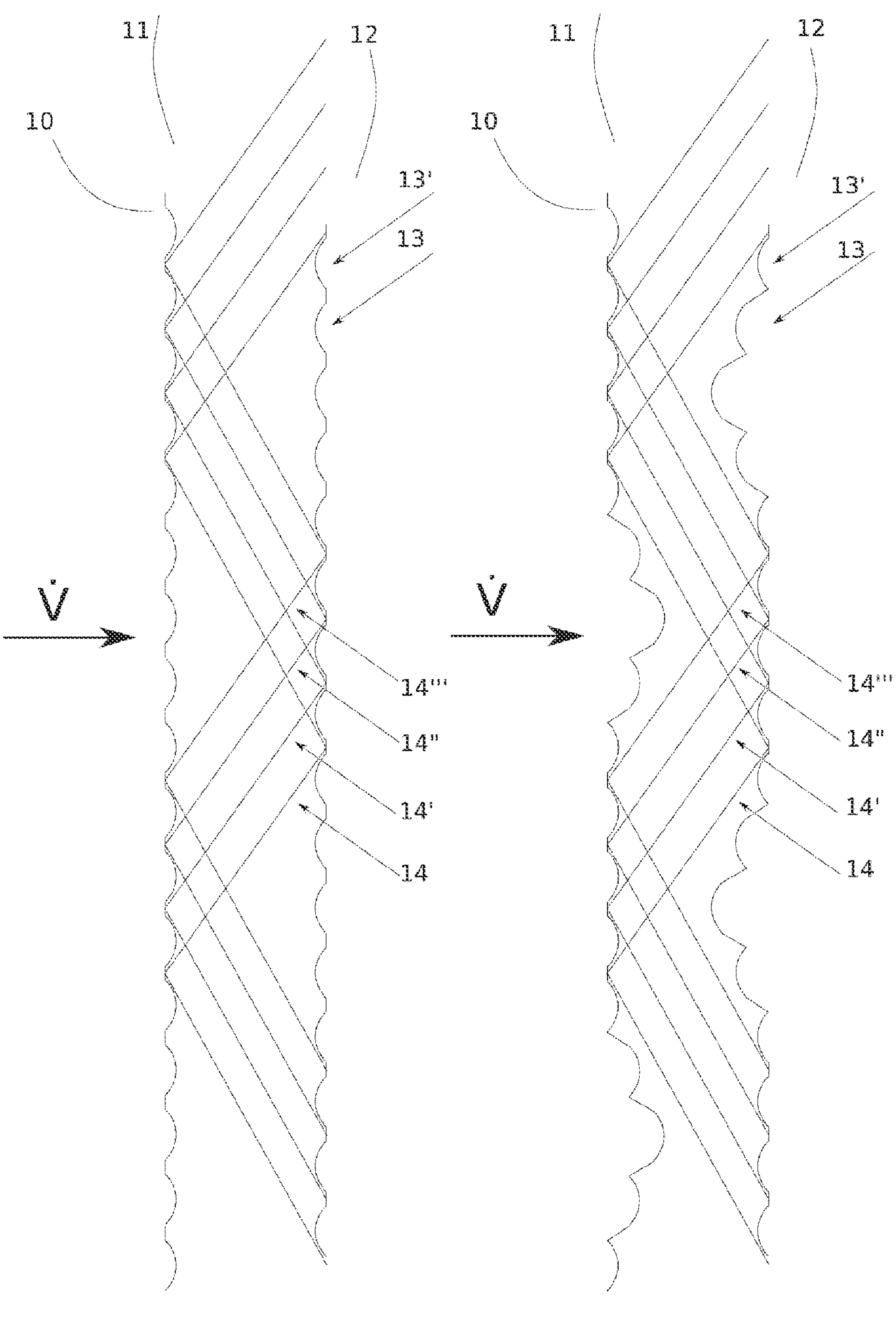
Figure 6:
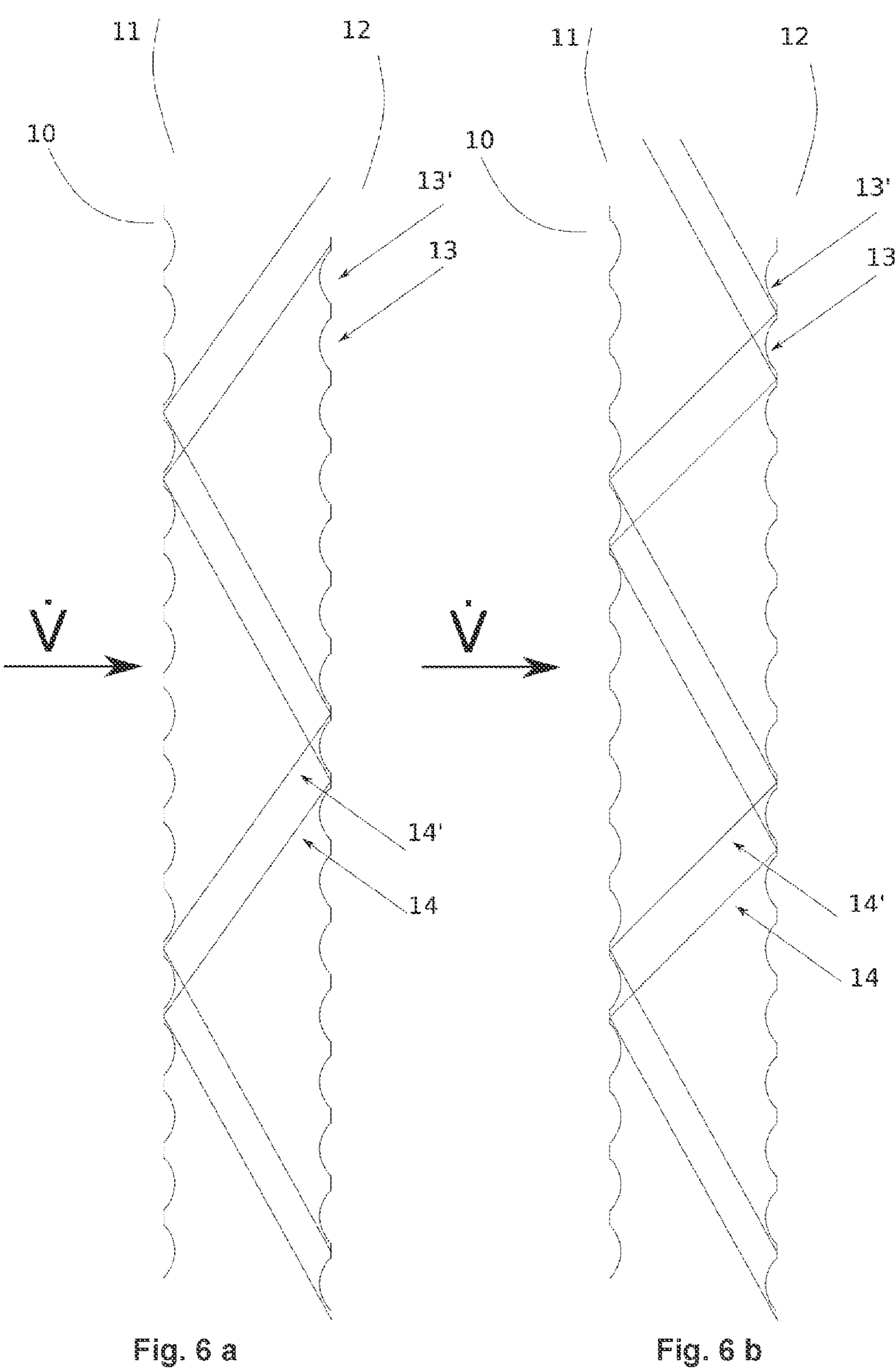
Figure 7:
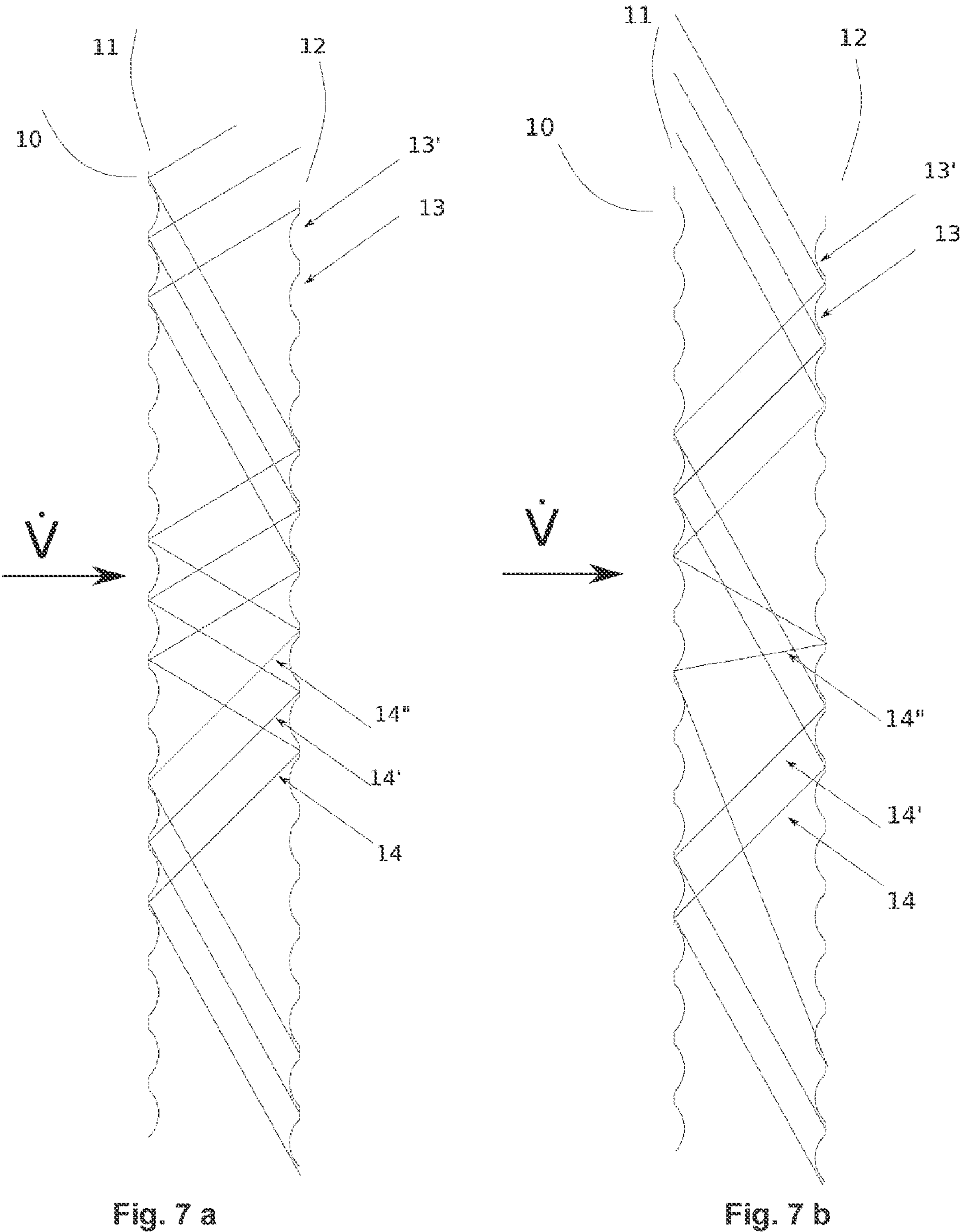

FIG. 4*a* shows the weft-knitted structure of a weft-knitted catalyst gauze from U.S. Pat. No. 6,073,467 A. In this weft-knitting process, two layers of stitches are connected with one another by pile threads. FIG. 4*b* shows the same embodiment as FIG. 4*a*, except only that the layers of stitches are illustrated as further removed from one another for reasons of clarity. This weft-knitting process leads to known catalyst gauzes that can be acquired by purchase. Reference numeral 10 in the diagrams shows a multi-layer gauze, consisting of a lower layer of stitches 11 and an upper layer of stitches 12. The fluid flow V is indicated with an arrow. In the figures, the angle of admission is 90°, but the flow could also have a tangential angle of admission to the gauzes. The direction of flow is not an absolute requirement. Reference numerals 13 and 13' show various stitches. Reference numerals 14 (and if applicable 14', 14'', etc.) show pile threads. The reference numerals are kept the same in all FIGS. 4 to 7. The labeling is retained by analogy with U.S. Pat. No. 6,073,467 A.

The invention present herein connects two layers of stitches by one or more pile threads. However, not all stitches are connected with one another, but instead stitches are selectively skipped and two layers of stitches are connected with one another in such a way that the pile threads exert, on the gauze, a pulling function that affects several stitches and leads to a desired tertiary structure, such as a wave pattern, for example.

The concept of the tertiary structure is of decisive importance and is to be understood in relation to the concept of the three dimensionality, which is not identical in meaning. The term "three-dimensional" is used in the documents EP 0 680 787 A1 and EP 1 358 010 B1. However, it does not mean and describe a: tertiary structure in the present sense. The process described in those patents describes a connecting of several layers in a way that allows a gauze to grow in the third dimension. In the process, the actual gauze surface always remains planar, by analogy with a process in which planar gauzes would simply be stacked one above the other. With the process presented here, however, gauzes that have relief-like, non-planar topographic surfaces can be generated and are referred to here, in contrast to the three-dimensional gauzes, as gauzes with tertiary structure. In such gauzes, the individual layers are no longer parallel to one another in the manner of planes, as sketched in FIG. 5*b*, for example, but instead exhibit on both sides a wave pattern due to different heights of the layers of stitches.

Whereas the pile thread or pile threads in previous production processes, such as described in DE 101 05 624 A1 or U.S. Pat. No. 6,073,467, for example, are oriented at 40 to 90 degrees to the gauze surface, the skipping of stitches means that at least partial regions of the pile thread or of the pile threads are disposed at greater than 0 degree to less than 40 degrees relative to the gauze surface or—in terms of the angle relative to the direction of gas flow—at greater than 50 degrees to less than 90 degrees. In this respect, reference is also made, for example to FIGS. 5*a*, 5*b*, 6*a*, 6*b*, 7*a* and 7*b*. The skipping of stitches results not only in an offset in the connection of the stitches of the upper and lower needle bed. To the contrary, some stitches of the layers of stitches remain unconnected by pile threads (see FIGS. 5*a*, 5*b*, 6*a*, 6*b*, 7*a*, 7*b*).

FIG. 5*a* shows a possible embodiment of one such weft-knitting process. Four pile threads connect two layers of stitches; in the embodiment sketched here, stitches are respectively skipped periodically. The number of stitches skipped may be chosen arbitrarily; the periodic embodiment is not an absolute requirement. The number of stitches skipped may also be non-periodic, in order to generate more complex patterns. If the pile threads always skip stitches at the same stitch positions during the weft-knitting process, a mirror-symmetric pattern is obtained, for example a wave pattern. In principle, however, the position of the stitches skipped by the pile threads may be varied even here in order to generate complex tertiary structures. The tertiary structures may have no mirror-symmetric or rotationally symmetric surface structure, but are not required to. In the case of symmetric patterns, e.g. wave patterns, the gauzes may preferably be incorporated in the reactor at various angles of rotation relative the tertiary structure. As soon as the gauze is installed in the reactor, the tertiary structure will become more pronounced, since the stiffness of the metal threads decreases at the high temperatures. The tertiary structure of the gauze that will be formed from the stitches connected with pile threads from FIG. 5*a* is indicated in FIG. 5*b*. FIGS. 6*a*, 6*b*, 7*a* and 7*b* show further possible forms of the invention. Two layers of stitches are connected by two pile threads in FIGS. 6*a* and 6*b* and by three pile threads in FIGS. 7*a* and 7*b*, wherein each the pile thread skips stitches. In the invention presented here, the layers of stitches must be connected with at least one pile thread, which connects the layers of stitches while skipping stitches in such a way that a tertiary structure is obtained.

Due to the tertiary structure of the gauzes, the angle of admission of the gases becomes more favorable and a higher conversion can be achieved in the reaction. In principle, a gauze with a tertiary structure has a larger surface than a gauze without tertiary structure. Therefore a reactor incorporating the same number of gauze layers having tertiary structure is more effective, or else the same efficiency can be achieved with a smaller number of gauze layers. A more efficient reactor also reduces $N_2O$ emissions.

Figure 8:
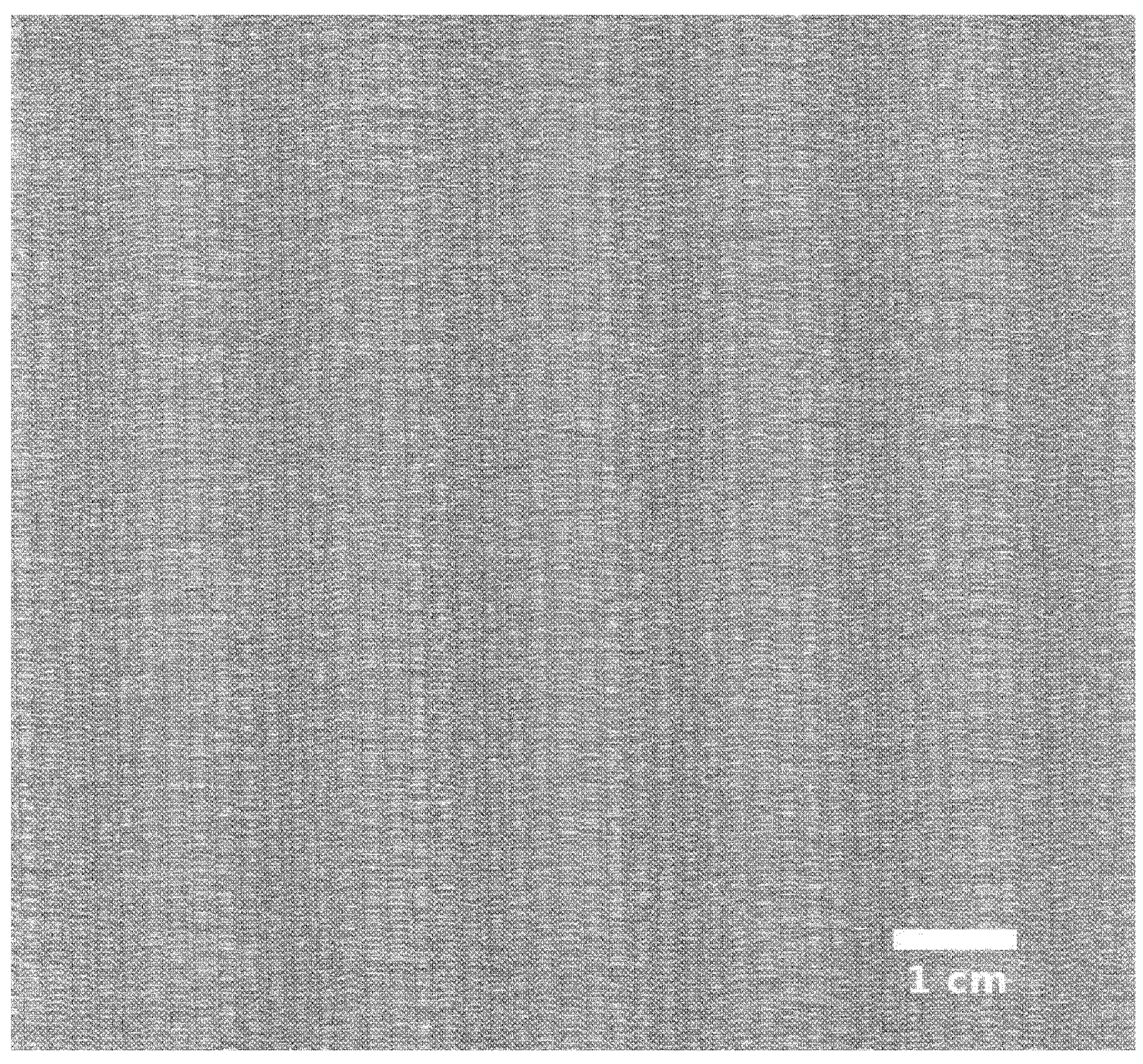
Figure 9:
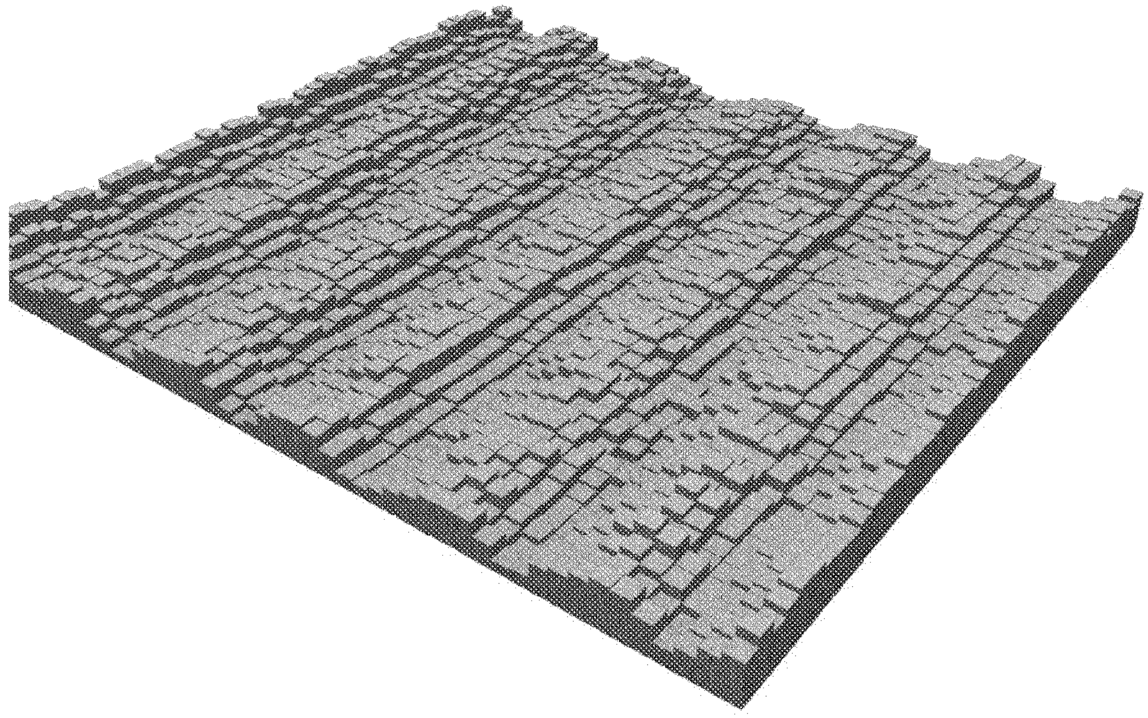
Figure 10:
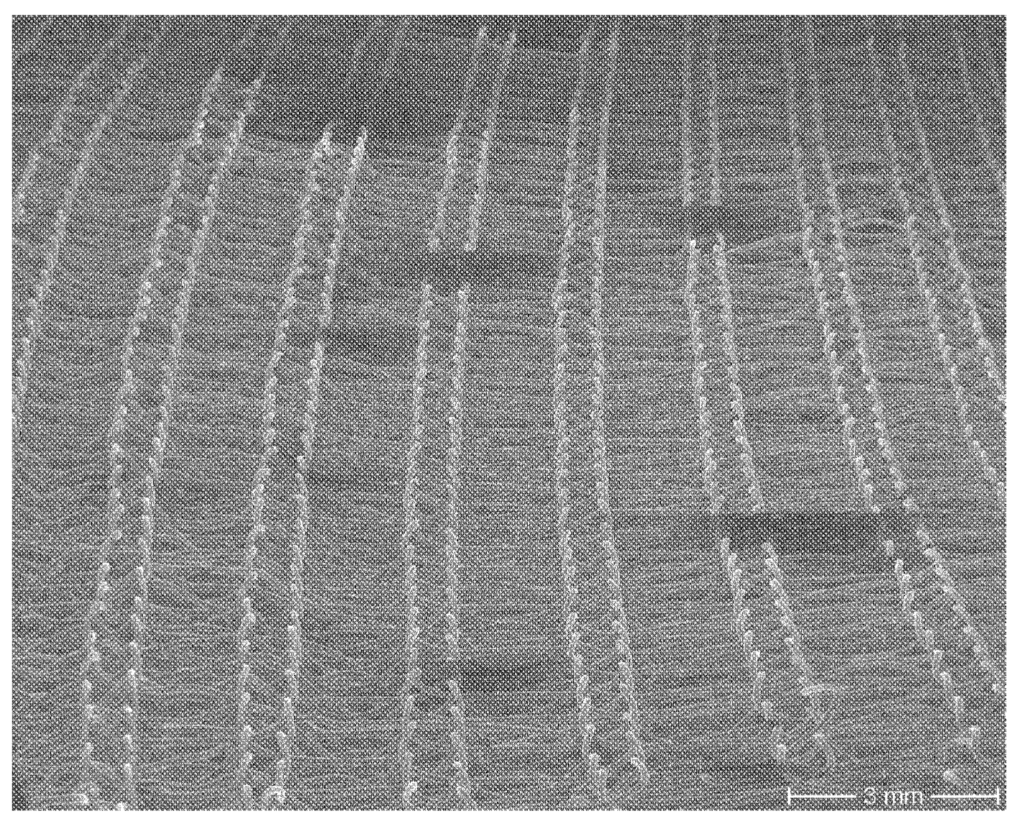
Figure 11:
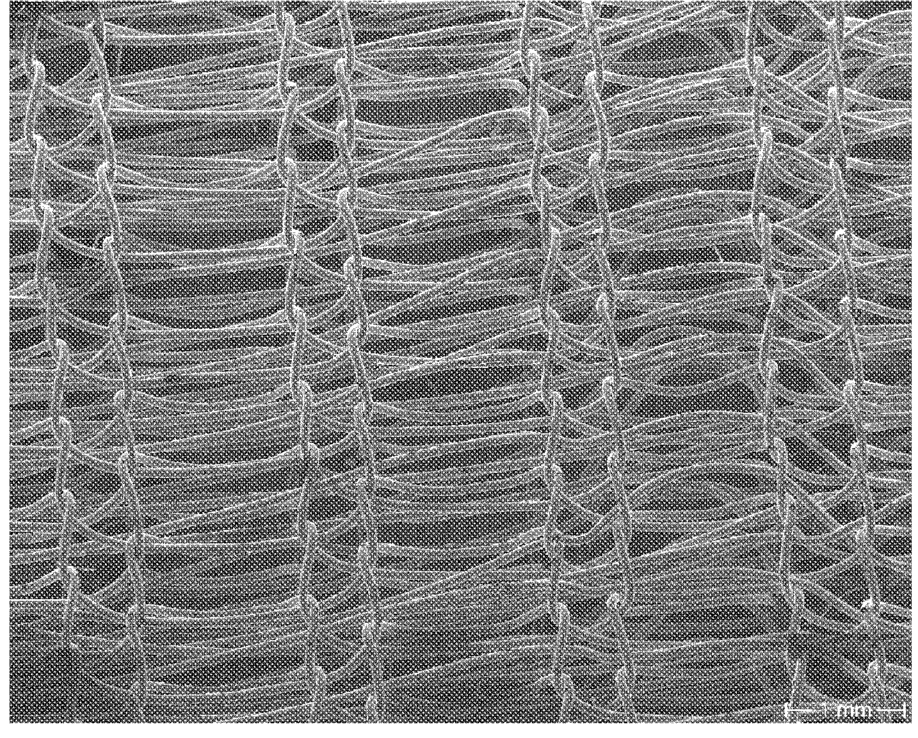
Figure 12:
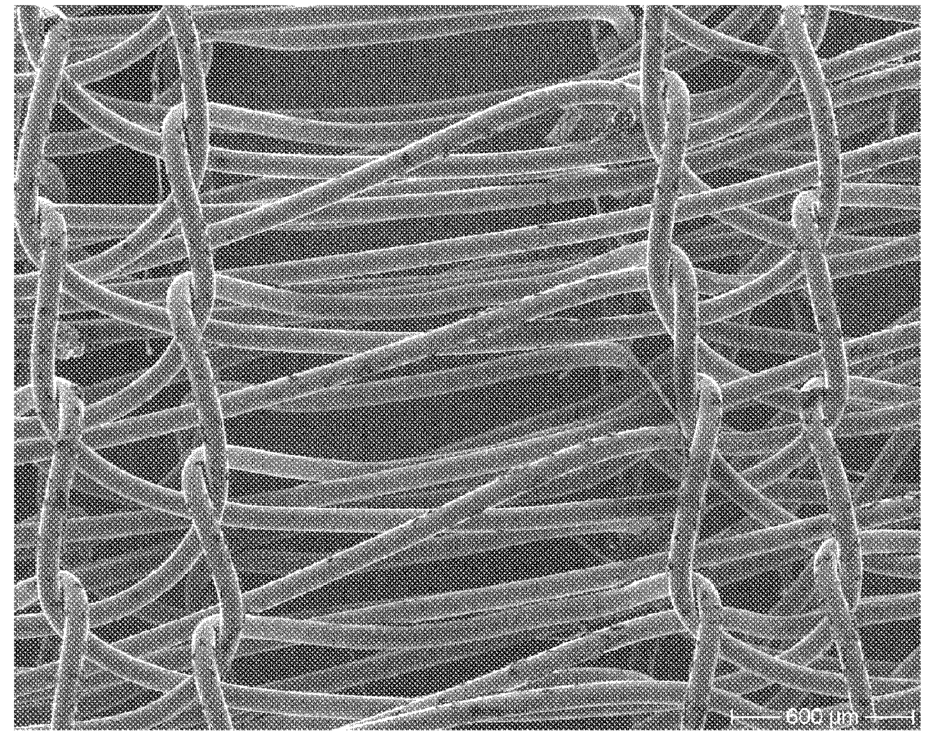

FIG. 8 shows a picture of a segment of the weft-knitted gauze according to the invention presented here with four pile threads. The figure was generated by a scan with a commercial scanner. The figure shows a distinct wave pattern on visual display screens. Some of this information is lost in printed matter. FIG. 9 shows a mathematical reconstruction of the height information with GIMP G'MIC. The wave structure is evident on both sides, whereas the information about the back side is lost by the scan. FIGS. 10 to 12 show electron microscope images, which illustrate the nature of the binding.

The invention claimed is:

1. Three-dimensionally weft-knitted noble-metal gauzes or partial pieces of such gauzes for carrying out catalytic reactions of fluids, wherein the gauzes are weft-knitted in two or more layers and the stitches of the individual layers are connected with one another by one pile thread or several pile threads in such a way that the noble-metal gauze has a tertiary structure that has a relief-like, nonplanar, topographical geometry.

2. Three-dimensionally weft-knitted noble-metal gauzes or partial pieces of such gauzes according to claim 1, wherein the stitches of the individual layers are connected with one another by pile threads in such a way that the gauze has a wave-shaped tertiary structure.

3. Three-dimensionally weft-knitted noble-metal gauzes or partial pieces of such gauzes according to claim 1, wherein the stitches of the individual layers are connected with one another by pile threads in such a way that the gauze has a non-symmetric tertiary structure.

4. Three-dimensionally weft-knitted noble-metal gauzes or partial pieces of such gauzes according to claim 1, wherein the stitches of the individual layers are connected with one another by pile threads in such a way that the gauze has a non-periodic tertiary structure.

5. Three-dimensionally weft-knitted noble-metal gauzes or partial pieces of such gauzes for carrying out catalytic reactions of fluids, wherein the gauzes are weft-knitted in two or more layers and the stitches of the individual layers are connected with one another by one pile thread or several pile threads in such a way that the noble-metal gauze has a tertiary structure that has a relief-like, nonplanar, topographical geometry, wherein partial regions of the pile thread or of the pile threads are disposed at greater than 0 degrees to less than 40 degrees relative to the gauze surface.

6. Three-dimensionally weft-knitted noble-metal gauzes or partial pieces of such gauzes for carrying out catalytic reactions of fluids, wherein the gauzes are weft-knitted in two or more layers and the stitches of the individual layers are connected with one another by one pile thread or several pile threads in such a way that individual stitches are selectively skipped, so that the noble-metal gauze has a tertiary structure that has a relief-like, nonplanar, topographical geometry.

7. Three-dimensionally weft-knitted noble-metal gauzes or partial pieces of such gauzes for carrying out catalytic reactions of fluids, wherein the gauzes are weft-knitted in two or more layers and the stitches of the individual layers are connected with one another by one pile thread or several pile threads in such a way that individual stitches are selectively skipped periodically, so that the noble-metal gauze has a tertiary structure that has a relief-like, nonplanar, topographical geometry.

8. Three-dimensionally weft-knitted noble-metal gauzes or partial pieces of such gauzes for carrying out catalytic reactions of fluids, wherein the gauzes are weft-knitted in two or more layers and the stitches of the individual layers are connected with one another by one pile thread or several pile threads in such a way that individual stitches are selectively skipped non-periodically, so that the noble-metal gauze has a tertiary structure that has a relief-like, nonplanar, topographical geometry.

* * * * *